US009644893B2

(12) United States Patent
Wright et al.

(10) Patent No.: US 9,644,893 B2
(45) Date of Patent: May 9, 2017

(54) CONTROL OF AN AIR DRYER REGENERATION CYCLE

(71) Applicant: NEW YORK AIR BRAKE, LLC, Watertown, NY (US)

(72) Inventors: Eric C. Wright, Evans Mills, NY (US); Richard Kohar, Kingston (CA)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 230 days.

(21) Appl. No.: 14/469,702

(22) Filed: Aug. 27, 2014

(65) Prior Publication Data

US 2016/0061523 A1 Mar. 3, 2016

(51) Int. Cl.

| | |
|---|---|
| ***B01D 53/02*** | (2006.01) |
| ***F26B 21/12*** | (2006.01) |
| ***F26B 5/16*** | (2006.01) |

(52) U.S. Cl.

CPC ................ *F26B 21/12* (2013.01); *F26B 5/16* (2013.01)

(58) Field of Classification Search

CPC .................................. F26B 21/12; F26B 5/16

See application file for complete search history.

(56) References Cited

U.S. PATENT DOCUMENTS 4,816,043 A 3/1989 Harrison
4,941,894 A * 7/1990 Black .................. B01D 53/047 95/122
5,199,964 A * 4/1993 Graff .................... B01D 53/261 95/123
5,989,313 A * 11/1999 Mize .................. B01D 53/0454 95/10
2005/0150377 A1* 7/2005 Friday .................... B01D 53/04 95/96
2013/0269522 A1* 10/2013 DeValve ............... F24F 3/1411 95/91

FOREIGN PATENT DOCUMENTS

| | | |
|---|---|---|
| EP | 0375220 | 6/1990 |
| EP | 2123343 | 11/2009 |
| WO | 02096732 | 12/2002 |

OTHER PUBLICATIONS

International Search Report Form PCT/ISA/220, International Application No. PCT/US2014/052817, pp. 1-10, Dated May 11, 2015.

* cited by examiner

*Primary Examiner* — Christopher P Jones

(74) *Attorney, Agent, or Firm* — David L. Nocilly; Bond, Schoeneck & King, PLLC

(57) ABSTRACT

A control system for an air dryer that switches the flow and counter flow of air through each of two desiccant towers in response to a drying cycle period that is proportional to the saturation partial pressure of water vapor in the inlet air stream as determined by the temperature of the stream of air in the inlet of the air dryer. The system may also include a proximity sensor positioned in the back flow check valve between the first main reservoir and the second main reservoir to further adjust the regeneration cycle period according to the flow rate through the air dryer.

18 Claims, 6 Drawing Sheets

CONTROL OF AN AIR DRYER REGENERATION CYCLE

BACKGROUND OF THE INVENTION

1. Field of the Invention

The present invention relates to desiccant air dryers and, more particularly to a system and method for controlling the regeneration cycle of a twin tower desiccant air dryer.

2. Description of the Related Art

Air dryers for railway use are typically a "pressure-swing absorption" type, also referred to as a twin-tower, desiccant air dryer. The basic control scheme for switching between the two columns of desiccant is a fixed timer enabled by a "compressor ON" signal from the compressor controls. Whenever the compressor is running, the air dryer cycles between two columns of desiccant at a fixed time cycle to direct wet product air through one column to remove the water vapor, thus resulting in dry product air, while simultaneously taking a fraction of the dry product air and counter-flowing it through the other previously saturated column of desiccant to remove accumulated moisture. Although simple and robust, this control scheme is inefficient and wastes considerable energy.

A typical AAR locomotive air supply system consists of a compressor and two main reservoirs in series, MR1 and MR2. The air dryer is usually installed between MR1 and MR2, so that dry air is delivered to MR2. MR2 is used as an exclusive air source for the train braking system and is protected by a back-flow check valve between MR1 and MR2. The air in MR1 is used for other locomotive air consumers like the windshield wipers, horn, sanders, etc. When the air is consumed from either MR1 or MR2, the compressor will operate to recharge the system. If the air pressure in MR1 is less than MR2, the compressor will operate so that air flows into MR1 to recharge it, but air will not flow into MR2 until the pressure in MR1 is greater than the pressure in MR2. In this situation, the air dryer regeneration cycle is enabled by a compressor 'on' signal. Because there is no air flow between MR1 and MR2, however, there is no air flow through the air dryer. As a result, the dry product purge air consumed by the air dryer regeneration cycle is wasted.

The second inherent inefficiency of the existing fixed timer regeneration control scheme is that it assumes that the water content of the incoming "wet" air is constant, and the fixed timing cycle is based on the worst case for maximum flow and maximum wet air. The amount of water vapor in air is directly proportional to the saturation water vapor partial pressure, which has a highly non-linear, exponential-like, relation with temperature. For example, the saturation water vapor partial pressure at 0° F. is 0.01857 psia; at 70° F. it is 0.3633 psia; at 125° F. it is 1.9447 psia, and at 150° F. it is 3.7228 psia. By contrast, air at 125° F. can contain 5.35 times as much water vapor as air at 70° F., and air at 150° F. can contain 10.2 times as much water vapor as air at 70° F. Thus, air at 125° F. can contain 105 times as much water vapor as air at 0° F., and air at 150° F. can contain 200 times as much water vapor as air at 0° F.

Thus, it is clear that an air dryer fixed cycle time regeneration cycle which is established on the water holding capacity of the desiccant bed and the water content of saturated air at the maximum inlet air temperature, e.g., 150° F. will cycle much more frequently than is necessary for lower temperatures and thus will waste dry product purge air. For example, a system designed to handle 150° F. saturated air, will be cycling 10.2 times too much at 70° F. and 200 times too much at 0° F. Thus, at 70° F., there is an opportunity to save approximately (17%-17%/10.2)=15% product air and compressor energy this is being wasted.

BRIEF SUMMARY OF THE INVENTION

The present invention comprises a control system for an air dryer that switches the flow and counter flow of air through each of two desiccant towers in response to a regeneration cycle signal. Where the drying cycle time is the time that air flows through the active desiccant tower, and the regeneration cycle time is the time duration that purge air counter-flows through the saturated desiccant tower, the system may include a drying cycle time that is variable depending on temperature while the regeneration cycle remains constant period of fixed duration that is optimized to regenerated the desiccant bed with a minimum purge air usage.

The system includes a sensor positioned in an inlet to an air dryer to output a signal corresponding to the temperature of an air stream in the inlet. The system also includes a controller interconnected to the temperature sensor that is programmed to calculate a drying cycle time that is proportional to the saturation partial pressure of water vapor in the inlet air stream based on the signal corresponding to the temperature of the stream of air in the inlet of the air dryer and to output a regeneration cycle signal according to the drying cycle time that causes the dryer to switch the active flow through the regenerated, dry desiccant tower and to initiate the regeneration cycle for the saturated tower with the counter flow of dry air through the saturated desiccant towers.

For example, the controller may be programmed to calculate the drying cycle time based upon a maximum cycle time that is adjusted based on the maximum actual inlet air temperature. The drying cycle T(dry) may be calculated based on a maximum cycle time $T(\text{dry})_{max\ cycle}$ and adjusted by the maximum actual inlet air temperature according to the formula:

$$T(\text{dry})=T(\text{dry})_{max\ cycle}\times[\text{Saturation Partial Pressure at maximum actual inlet air temperature}]/[\text{Saturation Partial Pressure at maximum inlet air temperature}]$$

The system may further include a proximity sensor positioned in a back flow check valve positioned in fluid communication between a first main reservoir and a second main reservoir that are connected in series. The proximity sensor may be configured to output a binary signal representing the position of the back flow check valve. In this embodiment, the controller is programmed to only send the regeneration cycle signal if the position sensor has output a signal indicating the back flow check valve is open. In addition, the controller may additionally be programmed to estimate the volumetric air flow through the air dryer based on whether the back flow check valve is open or closed.

The proximity sensor may also be configured to output a proportional signal representing the position of the back flow check valve. In this embodiment, the controller is programmed to calculate the volumetric air flow through the air dryer. The controller can further adjusts the drying cycle time based on the calculated volumetric air flow.

The control method of the present invention comprises measuring the temperature of an air stream in an inlet to the air dryer, calculating a drying cycle time that is proportional to the saturation partial pressure of water vapor in the inlet air stream based on the temperature of the air stream in the inlet to the air dryer, and switching the flow and counter flow of air through each of two desiccant towers according to the drying cycle time. The method may further include calculating a drying cycle time comprises adjusting a maximum cycle time based on the maximum actual inlet air temperature, where adjusting a maximum cycle time $T(\text{dry})_{max\ cycle}$ based on the maximum actual inlet air temperature to determine a regeneration cycle time T(dry) is performed according to the formula:

$$T(\text{dry})=T(\text{dry})_{max\ cycle}\times[\text{Saturation Partial Pressure at maximum actual inlet air temperature}]/[\text{Saturation Partial Pressure at maximum inlet air temperature}]$$

The method may further comprise the step of determining the position of a back flow check valve positioned in fluid communication between a first main reservoir and a second main reservoir connected in series and switching the flow and counter flow of air through each of two desiccant towers only occurs if the back flow check valve is open. If the valve is only determined to be opened or closed, the volumetric air flow through the air dryer may be estimated based on whether the back flow check valve is open or closed. If the actual position of the valve is determined, the volumetric air flow through the air dryer may be calculated. The drying cycle time may then be adjusted based on the estimated or the calculated volumetric air flow.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
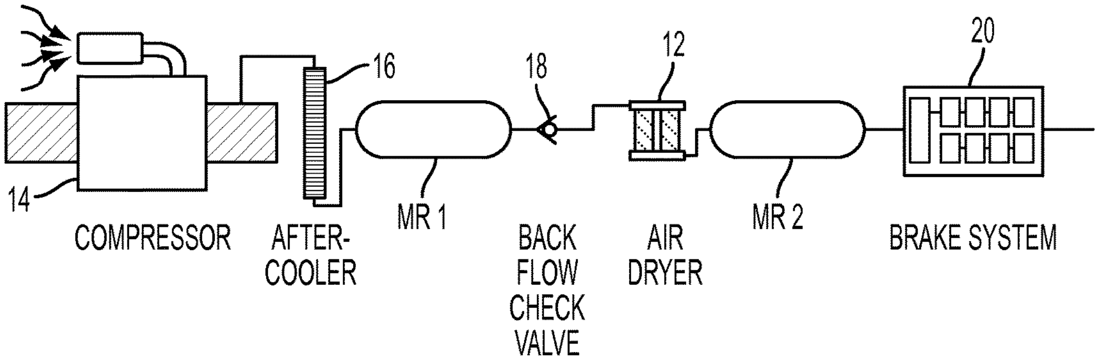
FIG. 1 is a schematic of a locomotive air supply system that includes a twin-tower, desiccant air dryer in which the control system of the present invention may be used.
Figure 2:
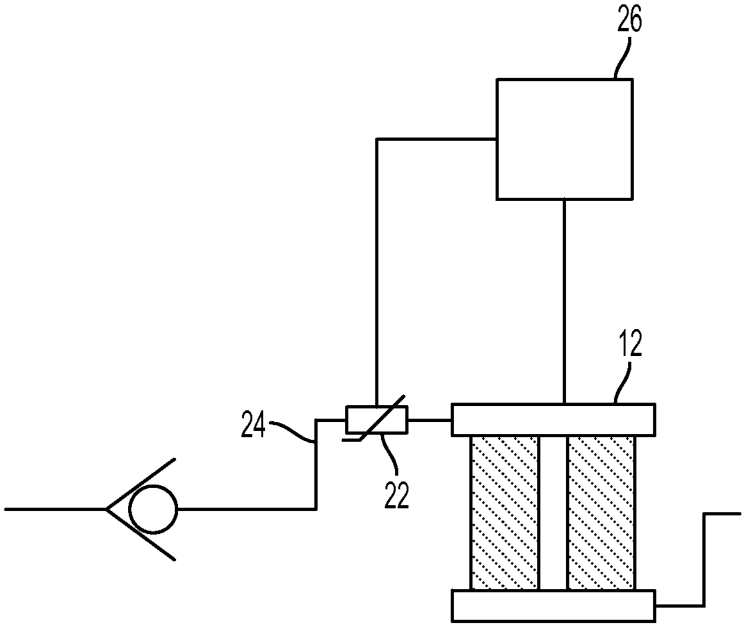
FIG. 2 is a schematic of a control system for a twin-tower, desiccant air dryer according to the present invention.

Referring now to the drawings, wherein like reference numerals refer to like parts throughout, there is seen in FIG. 2 a control system 10 for a twin-tower, desiccant air dryer 12 used in connection with a locomotive air supply system, such as that seen in FIG. 1. For example, the locomotive air supply system includes an air compressor 14 that provides compressed air via an aftercooler 16 to first main reservoir MR1. Pressurized air then flows from MR1 through a back flow check valve 18 to air dryer 12. Dried air is then provided from air dryer 12 to a second main reservoir MR2 for using by the locomotive brake system 20. In control system 10, the drying time cycle of the air dryer 12 is variable and proportional to the inlet air temperature only, or to the inlet air temperature and the inlet air flow. System 10 may be provided as part of air dryer 12 by including the necessary electronics and related components as discussed below for controlling the regeneration cycle.

Figure 3:
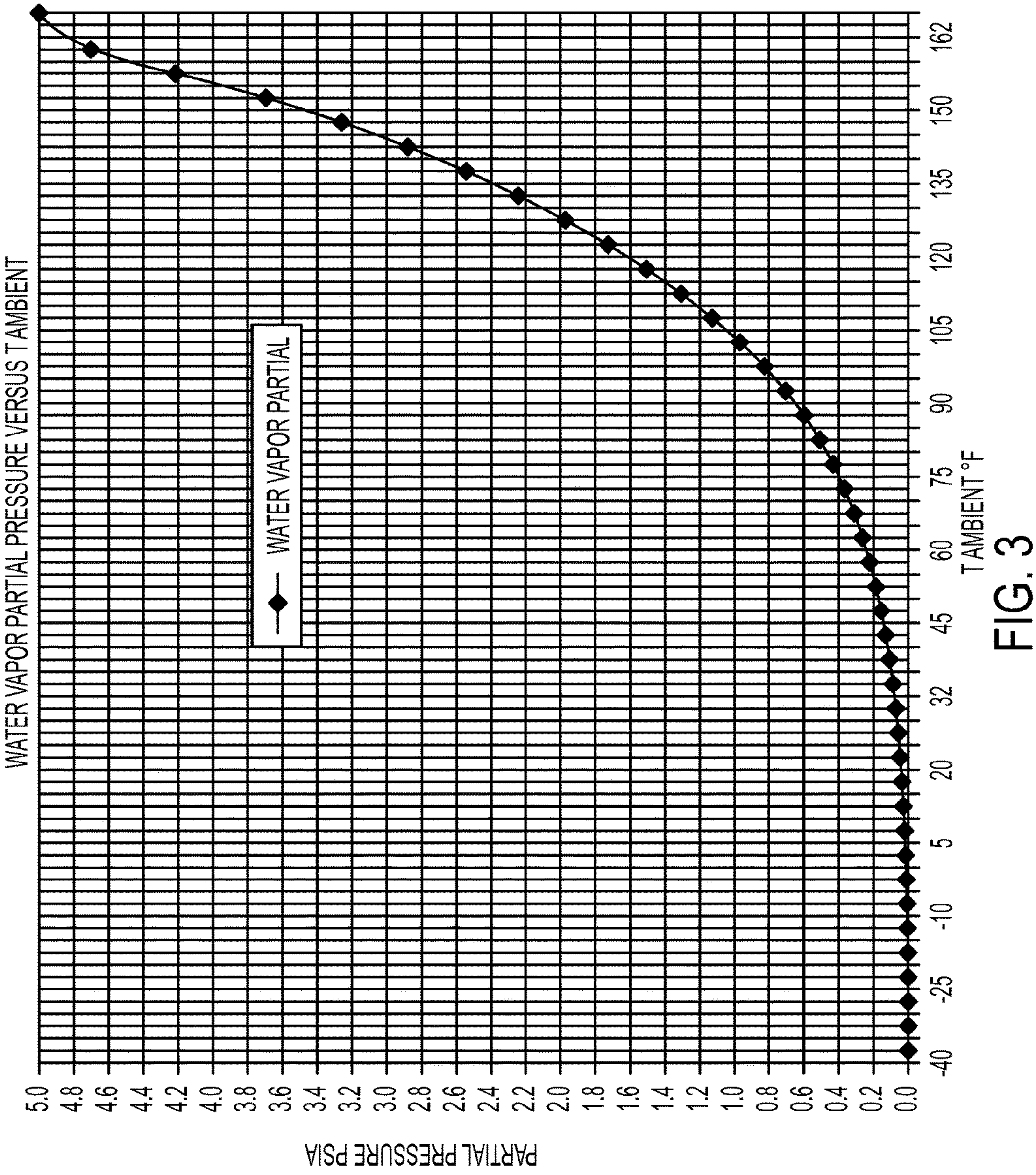
FIG. 3 is a graph water vapor partial pressure verses ambient temperature for use in programming the control system of the present invention.

Control system 10 includes a temperature sensing device 22, such as a thermistor or thermocouple, preferably located in the inlet air stream 24 to an air dryer 12. A controller 26 is programmed to use the inlet air temperature as determined by temperature sensing device 22 to adjust the drying cycle time T(dry) or air dryer 12 to be proportional to the saturation partial pressure of water vapor in air. The relationship between water vapor partial pressure and ambient temperature is illustrated in FIG. 3 and may thus be used by system 10 to adjust the drying cycle time T(dry) of air dryer 12 so that it is proportional to the saturation partial pressure of water vapor in air.

First, a maximum cycle time ($T_{max\ cycle}$) is determined based on the maximum expected flow rate through the air dryer with saturated air at the maximum expected inlet air temperature at the lower pressure governor setting of the compressor. System 10 then adjusts the actual drying cycle time T(dry) according to the following relationship:

$$T(\text{dry})=T(\text{dry})_{max\ cycle}\times[\text{Saturation Partial Pressure at maximum actual inlet air temperature}]/[\text{Saturation Partial Pressure at maximum inlet air temperature}].$$

In this way, the drying cycle time T(dry) is made proportional to the water holding capacity of the inlet air. It should be noted that the inlet air to the air dryer is almost always at saturation as a result of the compression of the atmospheric air from 1 bar (14.7 psia), to the main reservoir pressure, which is 9 to 10 bar (147.0 psia).

Figure 4:
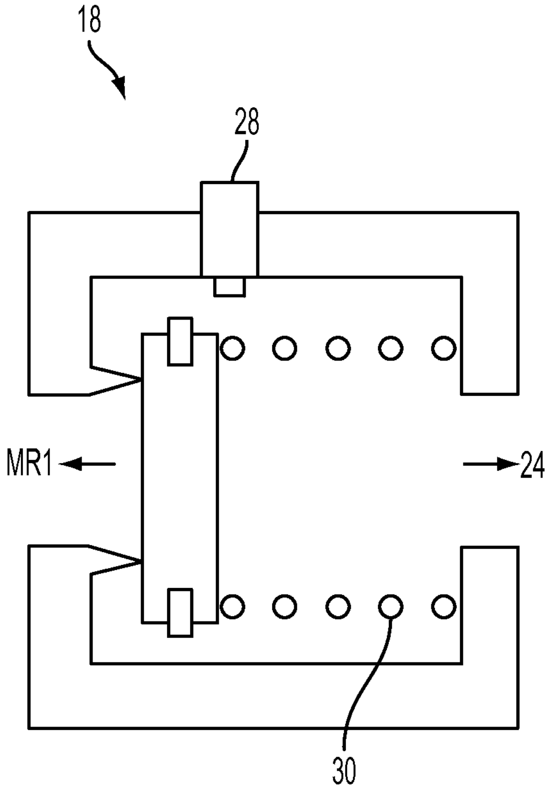
FIG. 4 is a schematic of a first back flow check valve having a position sensor according to the present invention.

Referring to FIG. 4, system 10 may optionally include a proximity sensor 28 positioned in back flow check valve 18 installed between MR1 and MR2 to provide a simple, robust measurement of air flow into the air dryer. Check valve 18 opens when MR1 pressure exceeds the pressure in MR2; otherwise, check valve 18 is held closed by a bias spring 30. Proximity sensor 28 is positioned to sense whether check valve 18 is open or closed.

Figure 5:
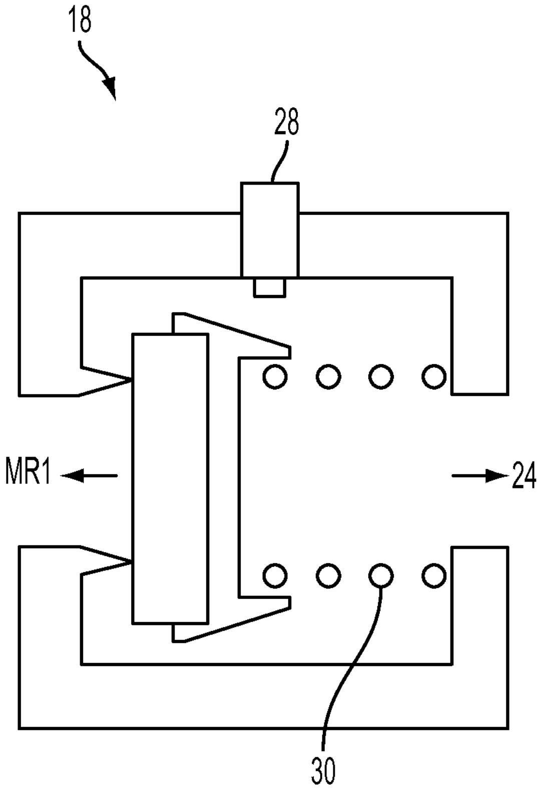
FIG. 5 is a schematic of a second back flow check valve having a position sensor according to the present invention.
Figure 6:
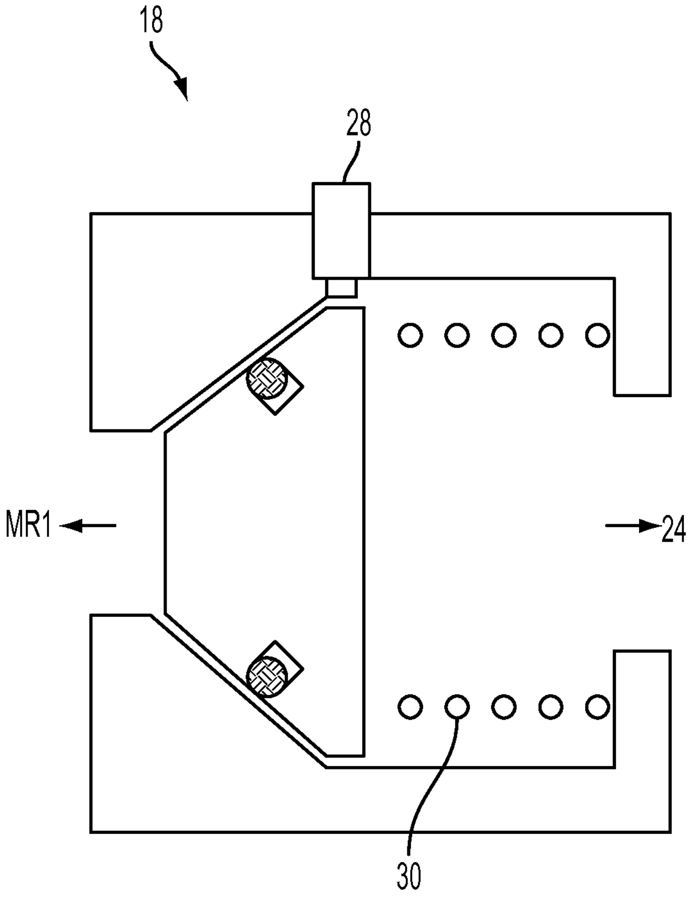
FIG. 6 is a schematic of a third back flow check valve having a position sensor according to the present invention.

Check valve 18 may be arranged so that proximity sensor 28 provides either a binary signal when check valve 18 is open or closed, or an analog signal proportional to the displacement of the movable check valve component against the bias spring. For example, FIG. 4 shows a binary sensing arrangement and FIGS. 5 and 6 illustrate proportional sensing arrangements. The signal from proximity sensor 28 is used by the regeneration electronics, such as controller 26, to enable the regeneration cycle only when there is flow through air dryer 12, as determined by the open or closed or displacement state of back flow check valve 18. This simple flow determination arrangement is a significant improvement over the prior art practice of enabling the regeneration cycle based strictly on compressor power 'on' status.

If proximity sensor 28 is arranged to provide a an signal that is proportional to the amount of opening of back flow check valve 18, then system 10 can adjust the drying cycle based on the calculated volumetric air flow through the air dryer. The size of the opening of back flow check valve 18 is proportional to the pressure difference across back flow check valve 18 ($P_{MR1}-P_{MR2}$) and the spring rate and preload of bias spring 30 in check valve 18. By measuring the check valve displacement, and knowing the check valve characteristics and valve geometry and spring rate, it is possible to calculate the pressure drop across the check valve ($P_{MR1}-P_{MR2}$) and to calculate the instantaneous flow rate across the check valve. The total air flow volume can then be calculated by a simple integration of the instantaneous air flow rate over time Preferably, the drying cycle is controlled using both the inlet air temperature correction for saturation partial pressure and the calculated air flow volume. When a check valve 18 having binary sensing is installed between MR1 and MR2, a pressure transducer in MR2 has a variable output, and a binary compressor function on/off signal is available, system 10 may adjust T(dry) according to air flow from MR1 to MR2. If MR1 and MR2 are at the same pressure and no flow is exiting MR2, when the compressor start operating it will simultaneously charge MR1 and MR2, with all flow going into MR1 and then ½ flow going into MR2 (note that MR1 and MR2 are typically the same size). Furthermore, if check valve 18 is open, the compressor is on, and the pressure in MR2 does not increase, then it can be inferred that all of the compressor flow is going through MR2 (and through the air dryer). If check valve 18 is open, the compressor is on, and the pressure in MR2 is increasing at less than the maximum rate, then it can be inferred that the flow rate into MR2 is the sum of the flow resulting in the pressure increase plus the outflow. The amount of the flow into MR2 through the air dryer can be estimated.

To recognize these minimum and maximum conditions the following control variables are used:

$\text{rate}P_{MR2\ MAX}$=maximum rate of change of $P_{MR2}$ (the maximum rate of change of $P_{MR2}$ occurs when the compressor is on, back flow check valve 18 is open, and there is no outflow from MR2)

$\text{rate}P_{MR2}$=actual rate of change of $P_{MR2}$

The following control algorithm is used to correct T(dry) for flow using the rate of MR2 pressure change versus time and when the Back Flow check valve is open and the compressor is on:

$$\text{flow corrected } T(\text{dry}) = T(\text{dry}_{max\ cycle}) \times \{1 - \text{rate}P_{MR2} / [2 \times \text{rate}P_{MR2\ MAX}]\}$$

In this way, the minimum flow rate occurs when rate $P_{MR2}=P_{MR2\ MAX}$ and the dry time $T(\text{dry})=½T(\text{dry}_{max\ cycle})$. The maximum flow rate occurs when $P_{MR2}=0$ with the compressor on and the check valve open. In this state, the $T(\text{dry})=T(\text{dry}_{max\ cycle})$. The T(dry) is likewise adjusted proportionally for rates of change of the pressure in MR2 between these limits: $0<P_{MR2}<\text{rate}P_{MR2\ MAX}$. Lastly, the drying time, T(dry), can be corrected for both temperature and flow as follows:

$$T(\text{dry}) = T(\text{dry}_{max\ cycle}) \times [\text{Saturation Partial Pressure at actual inlet air temperature}] / [\text{Saturation Partial Pressure at maximum inlet air temperature}] \times \{1 - \text{rate}P_{MR2} / [2 \times \text{rate}P_{MR2\ MAX}]\}$$

System 10 may thus implement a drying cycle time that is variable depending on temperature while the regeneration cycle remains constant period of fixed duration that is optimized to regenerated the desiccant bed with a minimum purge air usage. Conventional regeneration control occurs as set forth in Table 1 below, with the time of each stage provided as an example:

TABLE 1

| | Cycle Stage | | | |
|---|---|---|---|---|
| | 1 | 2 | 3 | 4 |
| A Tower | Drying | Drying | Regenerating | Repressurizing |
| B Tower | Regenerating | Repressurizing | Drying | Drying |
| Time in Stage | 50 Seconds | 20 seconds | 50 seconds | 20 seconds |

A regeneration signal, which results in a switch in the cycle progression for each of the A and B towers, is sent at the end of Stage 2 to switch operations between Tower A and Tower B, and then again at the end of Stage 4 to return to the configuration of Stage 1. According to the present invention, a variable drying cycle time may be implemented as illustrated in Table 2 below, with the time of each stage provided as an example:

TABLE 2

| Cycle Stage | 1 | 2a | 2b | 3 | 4a | 4b |
|---|---|---|---|---|---|---|
| A Tower | | Drying | | Regenerating | Repressurizing | Holding |
| Time in Stage | | Time f(temp, flow) | | 50 seconds | 20 seconds | Remainder |
| B Tower | Regenerating | Repressurizing | Holding | | Drying | |
| Time in Stage | 50 seconds | 20 seconds | Remainder | | Time f(temp, flow) | |

In Table 2, the regeneration signal is sent after each tower has concluded its variable length drying cycle, e.g., after Stage 2b and again after Stage 4b, with the non-drying tower being maintained into a holding cycle while the drying tower concludes its variable length drying cycle.

It should be recognized that control system 10 could be implemented in independent circuits, a programmable microcontroller or microprocessor, programmed firmware, analog circuitry, digital circuitry, or combinations thereof, either as an addition to the electronics associated with air dryer 12 or as a separate package that interfaces with air dryer 12.

What is claimed is:

1. A control system for an air dryer that switches a flow and counter flow of air through each of two desiccant towers in response to a regeneration cycle signal, comprising:

a sensor positioned in an inlet to an air dryer to output a signal corresponding to the temperature of an air stream in the inlet;

a proximity sensor positioned in a back flow check valve positioned in fluid communication between a first main reservoir and a second main reservoir that are connected in series; and a controller interconnected to the temperature sensor that is programmed to calculate a drying cycle time that is proportional to the saturation partial pressure of water vapor in the inlet air stream based on the signal corresponding to the temperature of the stream of air in the inlet of the air dryer and to output a regeneration cycle signal according to the drying cycle time that causes the flow and counter flow of air through each of the two desiccant towers to switch.

2. The system of claim 1, wherein the controller is programmed to calculate the drying cycle time based upon a maximum cycle time that is adjusted based on a maximum actual inlet air temperature.

3. The system of claim 2, wherein the drying cycle T(dry) is calculated based on a maximum cycle time T(dry)max cycle and adjusted by the maximum actual inlet air temperature and a maximum actual inlet air temperature according to the formula:

$$T(\text{dry}) = T(\text{dry})\text{max cycle} \times [\text{saturation partial pressure at maximum actual inlet air temperature}] / [\text{saturation partial pressure at maximum inlet air temperature}].$$

4. The system of claim 1, wherein the proximity sensor is configured to output a binary signal representing the position of the back flow check valve.

5. The system of claim 4, wherein the controller is programmed to only send the regeneration cycle signal if the position sensor has output a signal indicating the back flow check valve is open.

6. The system of claim 5, wherein the controller is further programmed to estimate the volumetric air flow through the air dryer based on whether the back flow check valve is open or closed.

7. The system of claim 1, wherein the proximity sensor is configured to output a proportional signal representing the position of the back flow check valve.

8. The system of claim 7, wherein the controller is further programmed to calculate the volumetric air flow through the air dryer.

9. The system of claim 8, wherein the controller further adjusts the regeneration cycle time based on the calculated volumetric air flow.

10. A method of controlling the regeneration cycle of an air dryer that switches the flow and counter flow of air through each of two desiccant towers, comprising the steps of:

measuring the temperature of an air stream in an inlet to the air dryer with a sensor positioned in the inlet of the air dryer to output a signal corresponding to the temperature of the air stream in the inlet;

determining the position of a back flow check valve positioned in fluid communication between a first main reservoir and a second main reservoir connected in series with a proximity sensor positioned in the back flow check valve;

using a controller interconnected to the temperature sensor to calculate a drying cycle time that is proportional to the saturation partial pressure of water vapor in the inlet air stream based on the temperature of the air stream in the inlet to the air dryer based on the signal corresponding to the temperature of the stream of air in the inlet of the air dryer; and outputting a regeneration cycle signal according to the drying cycle time that causes switching of the flow and counter flow of air through each of two desiccant towers according to the drying cycle time.

11. The method of claim 10, wherein the step of calculating a drying cycle time comprises adjusting a maximum cycle time based on the maximum actual inlet air temperature.

12. The method of claim 11, wherein the step of adjusting a maximum cycle time T(dry)max cycle based on the maximum actual inlet air temperature to determine a regeneration cycle time T(dry) is performed according to the formula:

$$T(\text{dry})=T(\text{dry})\text{max cycle}\times[\text{saturation partial pressure at maximum actual inlet air temperature}]/[\text{saturation partial pressure at maximum inlet air temperature}].$$

13. The method of claim 10, wherein the position of the back flow check valve is determined to be either open or closed.

14. The method of claim 13, wherein the step of switching the flow and counter flow of air through each of two desiccant towers according to the drying cycle time only occurs if the back flow check valve is open.

15. The method of claim 14, further comprising the step of estimating the volumetric air flow through the air dryer based on whether the back flow check valve is open or closed.

16. The method of claim 10, wherein the amount of displacement of the back flow check valve is determined.

17. The method of claim 16, further comprising the step of calculating the volumetric air flow through the air dryer based on the amount of displacement of the check valve.

18. The method of claim 17, further comprising the step of adjusting the drying cycle time based on the calculated volumetric air flow.

* * * * *